Figure 1:
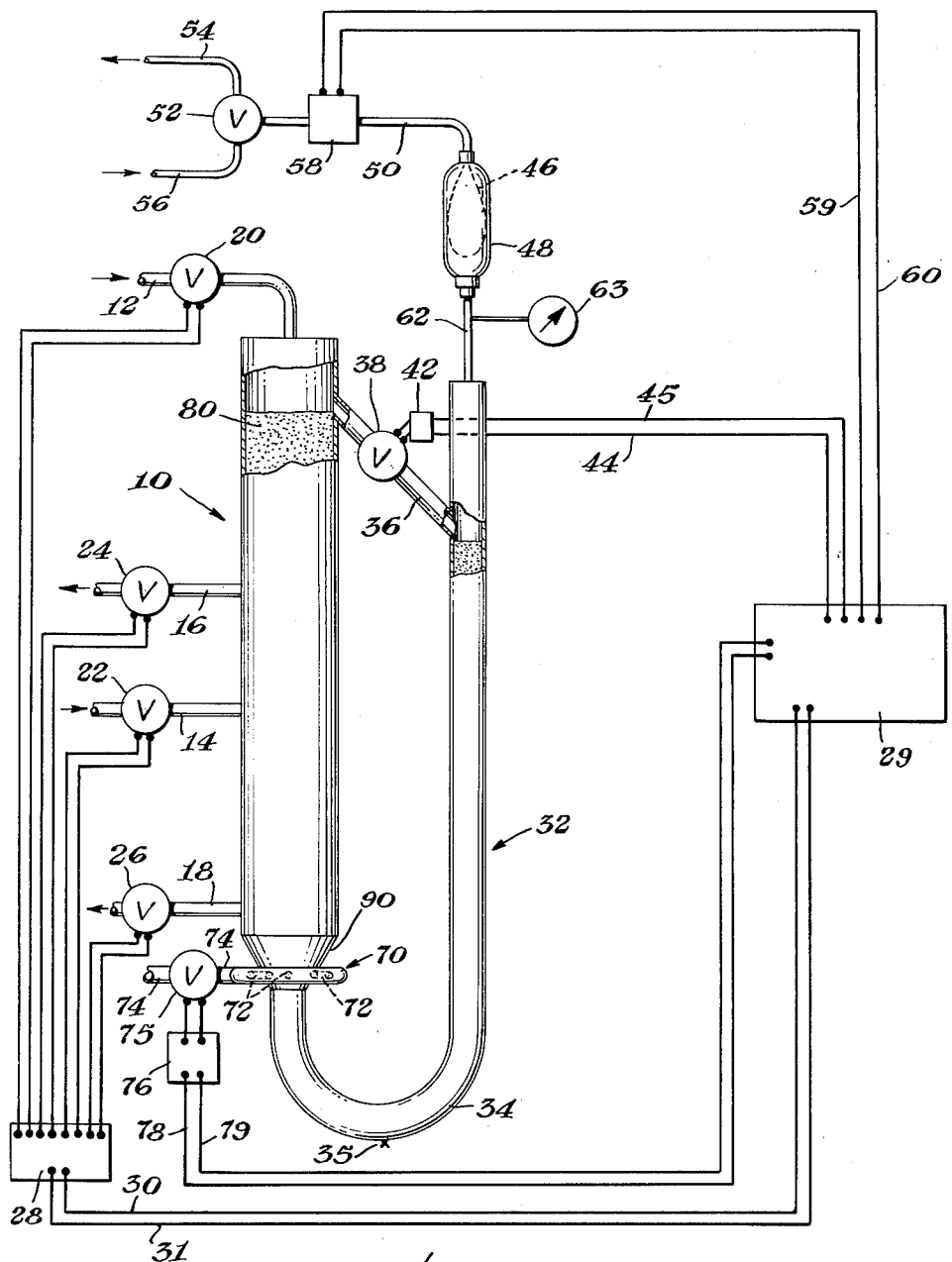
Figure 2:
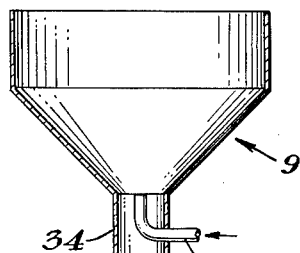
Figure 3:
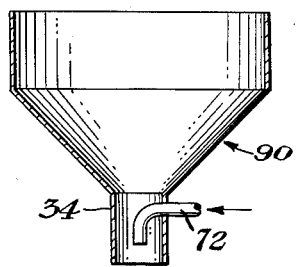
Figure 4:
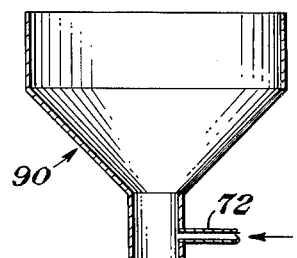
Figure 5:
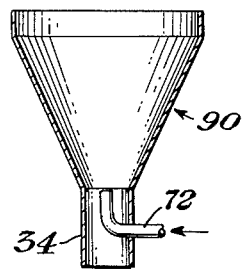
Figure 6:
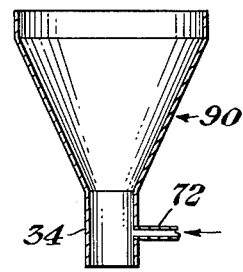

INVENTORS.
Jacob Eichhorn
Alfred H. Seamster
Robert S. Beall
BY C.U.Carlin
ATTORNEY INVENTORS.
Jacob Eichhorn
Alfred H. Seamster
Robert S. Beall BY C.W.Carlin

ATTORNEY

United States Patent Office 3,056,743
Patented Oct. 2, 1962

3,056,743
MOVEMENT OF CONFINED PARTICULATE SOLIDS
Jacob Eichhorn, Alfred H. Seamster, and Robert S. Beall, Midland, Mich., assignors to The Dow Chemical Company, Midland, Mich., a corporation of Delaware
Filed Aug. 19, 1959, Ser. No. 834,792
10 Claims. (Cl. 210—33)

The invention pertains generally to an improved method of moving a bed of particulate material confined in a column upwardly in that column and to the improved device for use in such method. It pertains especially to such method and device when used in association with operations concerned with contacting a body of particulate material with a treating liquid.

The movement of particulate material is a desirable and often an essential step in operations wherein particulate material is contacted by a liquid. Illustrative of such operations is the passing of a liquid through a bed of particulate material either to effect a change in the particulate material or to effect a change in the liquid, e.g., purification thereof or the exchange or exclusion of ions in the liquid as when the liquid is passed through an appropriate bed of particulated clay, sand, or resin.

Beds of particulate material are often required to be moved only at intervals, the beds in such instances resisting such movement especially at the beginning of the movement due to inertia, adherence of particles to the wall of the container, packing and bridging of the particles, and the like. The need to move periodically such beds is well exemplified where liquids are brought into contact with resins, e.g., resins which are employed in ion exchange or ion-exclusion separations, whether or not treatment is continuous or alternate loading and elution periods are employed. Periodically during treatment or following either one or both the loading and elution periods when such are employed, it is often desired that at least a portion of the resin bed in the contacting zone be moved to provide washed, drained, or otherwise freshened resin in the resin-liquid contacting zone.

An apparatus for and method of contacting a bed of suitable resin particles with a liquid to be treated is described in U.S. Patent No. 2,815,322 to Higgins. The Higgins patent describes and illustrates a resin-liquid contacting apparatus which provides for upward movement of the resin bed in a resin-liquid contacting tower by means of force applied to a supply of resin in a reservoir or receptacle, usually a substantially vertical pipe, parallel to the contacting tower, often referred to as a down-leg, connected to the contacting tower by resin transfer lines, one for transferring resin to the bottom of the tower and one for returning resin from the top of the tower to the supply reservoir, and a means for reducing pressure on the resin supply in the reservoir or down-leg. By reducing pressure above the resin in the contacting zone and increasing the pressure on the resin in the reservoir, some of the resin in the lower part of the reservoir is caused to move into the lower part of the contacting zone and some of the resin in the upper part of the contacting zone is caused to move into the upper part of the reservoir.

A particularly objectionable feature is associated with the operation of known types of apparatuses wherein movement of particulate material is required. This feature is the resistance to movement of the resin when pressure is applied to the resin in the reservoir or down-leg. In some instances, under otherwise acceptable operating conditions, the resin cannot be moved at all at pressures that can be safely and practically applied. When movement of the resin is attained, it requires relatively high pressures and it is accompanied by a pronounced jerky movement having serious adverse effects upon proper resin movement and upon the apparatus.

The principal objects of the invention are to provide a method of and means for moving confined wetted particulate material smoothly in a plug-flow manner in a confining vessel with the application of appreciably lower pressure on the supply source than heretofore required.

Moving material smoothly contemplates moving it substantially without jerks, vibration, or other objectionable sporadic irregularities. The term plug-flow is used herein in the sense commonly applied to the movement of beds of particulate solids which is characterized by a movement of the particles substantially as an integral unit, i.e., all particles being moved more-or-less the same distance and being maintained substantially in the same relative positions to one another in a confining vessel.

How these and related objects of the invention are attained will appear in the ensuing description when read in reference to the annexed drawing and is concisely defined in the appended claims.

The invention is an improvement in a method of contacting a body of wetted particulate solids confined in a column having access at the bottom of said body to a source of particulate solids by means of a connecting channel, such as a conduit or transfer line extending from the source of supply, moveable by the application of pressure thereon into the lower part of said column through the connecting channel, and wherein the particulate solids in the column are required to be moved upwardly, at least periodically, as a substantially plug-flow body, by the application of pressure on the source. The improvement consists of injecting a liquid, usually water, into the body of solids substantially at, or not far below, the place of entrance into the column of the solids from the source thereof, and at substantially the same time applying pressure on the source of supply sufficient to overcome the hydrostatic head of the wetted body of solids in the column.

The term at substantially the same time herein employed means more-or-less concurrently, or more specifically, just before, during, or after the application of pressure on the supply source. It it preferred that the timing of the injection of the liquid, e.g., water, coincide generally with the application of pressure on the resin supply source and be continued throughout the time that pressure is applied to the particulate solids in the supply source.

The pressure at which the liquid is injected is not critical so long as it is greater than the resisting pressure at the place of injection due to the hydrostatic head and/or pressure applied to the supply of particulate resin. A gauge pressure of from 5 to 20 pounds per square inch is commonly employed. The rate of flow of the liquid being injected is recommended to be between 0.5 and 5.0 gallons per minute per square foot of cross-sectional area of the resin column although higher or lower rates may be used. The rate of flow employed is usually between 1 and 3 gallons per minute per square foot. The cross-section of the stream of liquid injected is not critical. It is usually on the order of ¼ to 1 to 2 inches, the larger cross-sectional streams being usually employed with larger cross-sectional resin column to enable the resin to be moved in less time than when small streams are used. The preferred means of injecting the liquid is to employ a plurality of injection pipes which are prefereably spaced axially and substantially equi-distant apart about the conduit leading from the supply source to the column and located just below the place of entrance of the solids into the resin column.

The shape or design of the bottom of the contacting tower through an opening in which the particulate resin from the supply source is admitted may be flat but is preferably frusto-conical having its walls converging downwardly and having the conduit for the resin entrance open into what would normally be the apex thereof. It is recommended that the angle formed between the sloping sides of the frusto-conical bottom be not over 90° and preferably about 50° C. When such concial sides form greater than a 50° angle, some resin in the column is usually by-passed since some space exists between the opening and the walls of the cone in which the resin moves little or none.

For practical reasons it is desirable to employ a down-leg or reservoir and feed conduit, leading therefrom to the contacting column, which is of relatively small cross-sectional area in contrast to that of the contacting column. Among such reasons are a smaller volume of resin required without loss of throughput of liquid being treated, lower equipment costs, and less floor area requirements. The method and apparatus of the invention are particularly adapted to moving resin smoothly when employing a contacting column of resin of appreciably greater diameter than that of the down-leg and transfer conduit.

Methods of using ion-exchange or ion-exclusion particulate solids are well known. Apparatuses for use in such methods, commonly referred to as contactors, and including water softeners and the like, are also well known. The method and apparatus described in the Higgins patent, to which reference was made above, is satisfactory for the purposes of illustrating a known method and apparatus, of which the instant invention is an improvement.

The instant invention is not limited to any type of particulate solids. However, it is primarily directed toward particulate solids used for the purpose of removing materials form a liquid or altering its compositions as by exchanging or excluding specific ions contained in the liquid. It is especially directed to treating liquid which have materials removable or exchangeable by contact with such materials as zeolite, green sand, and the many synthetic resins now known to be useful for this purpose. Methods of preparing resins suitable for use in ion-exchange and ion-exclusion separation which are illustrative of those useful in the practice of the invention are well known. The more generally recognized desirable properties of such resin are set out in U.S. Patent No. 2,366,007. Suitable resins such as those described therein may be used in either fixed or moving beds. A discussion and comparison of fixed and moving beds of ion-exchange or ion-exclusion resins is described in detail in an article entitled "Comparing Fixed and Moving Bed," in Engineering and Mining Journal, vol. 160, No. 3, pages 80 to 83 (March 1959).

The apparatus of the instant invention and modifications of the apparatus comprising applicants' improvement are shown in the drawing.

In the drawing FIGURE 1 is an elevational view, partly in section, of an apparatus for contacting liquid and particulate solids which is illustrative of the improvement of the present invention. Variations in the design of the resin inlet portion of the liquid-resin contactor tower of the apparatus combined with variations in the type of injection means for the liquid according to the practice of the invention are shown in FIGURES 2 to 10.

Figure 11:
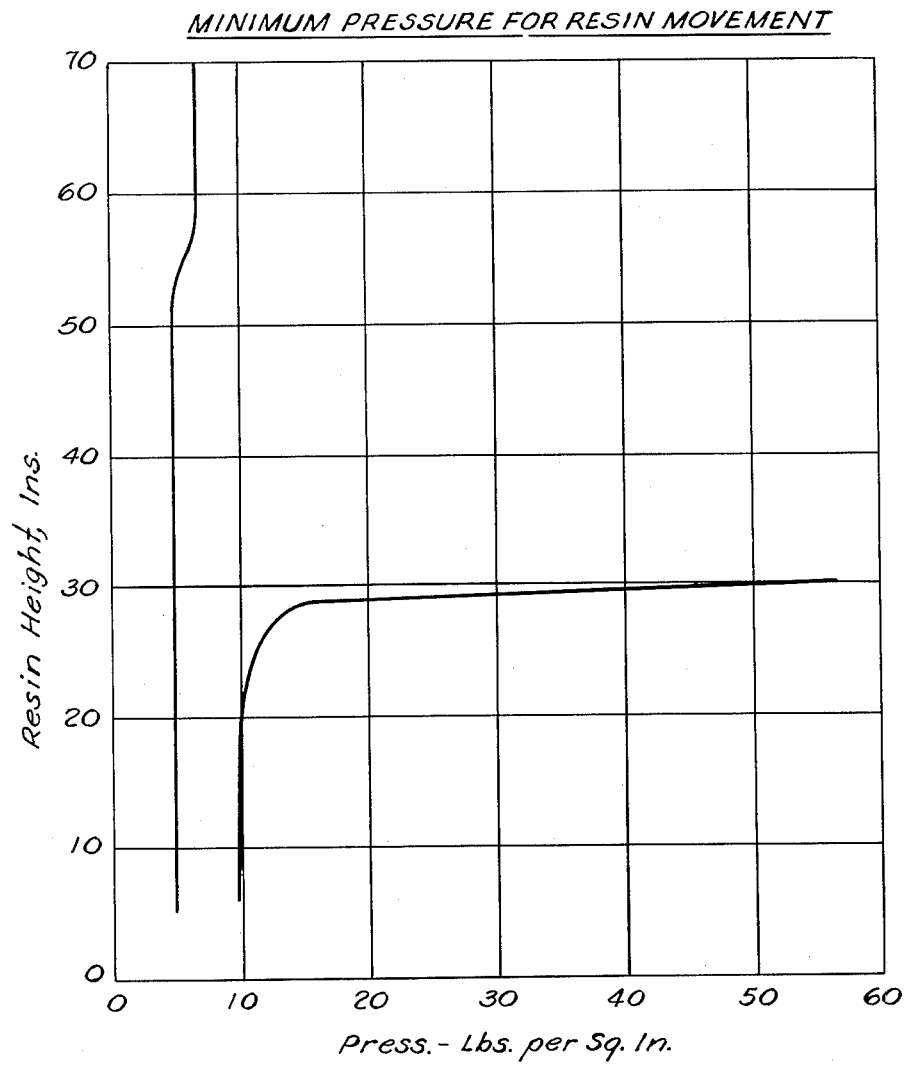

FIGURE 11 shows graphically the effect on movement of an ion-exchange resin by the use of water injection apparatus of the invention, in comparison with conventional practice, expressed in pounds per square inch of pressure on the resin supply plotted against the height of the resin in the contactor column.

In FIGURE 1 there is shown a contactor tower 10 provided with wash inlet pipe 12 for introducing a wash liquid, e.g., water, and feed pipe 14 for introducing a liquid to be treated by contact with a resin in the contactor column and product outlet pipe 16 and co-product outlet pipe 18 for separated portions of the treated liquid. Valve 20 in wash pipe 12, valve 22 in feed pipe 14, valve 24 in product outlet pipe 16, and valve 26 in co-product outlet pipe 18 are a means for controlling the flow of liquids therethrough. Valves 20, 22, 24, and 26 are operated by suitable means, as by the valve-control assembly represented by numeral 28 actuated by timer 29 through connecting line 30 and 31.

Down-leg or reservoir 32 serving as the particulate resin supply is shown connected at the bottom thereof to the lower part of tower 10 by U-transfer conduit 34 for transferring resin to tower 10. The lowest point in transfer conduit 34 is indicated by numeral 35. To the upper part of tower 10 is shown return conduit 36 for return of resin to reservoir 32. Valve 38 in conduit 36 controls the flow resin into reservoir 32 and is operated by suitable means as by the air-operated valve-control assembly represented by numeral 42 which is actuated by timer 29 through lines 44 and 45.

Pressure for providing a moving force for particulate resin in reservoir 32 may be provided by one of many ways. FIGURE 1 shows a Greer-type accumulator for the purpose. A description of the Greer accumulator is set out in Bulletins 300, 301, and 301A published by Greer Hydraulics, Inc., 454 18th Street, Brooklyn, New York. The accumulator in FIGURE 1 known as a hydropneumatic accumulator comprises collapsable bag 46 suspended in inclosing vessel 48 and having an opening in the top thereof connected to air line 50. Air line 50 leads from three-way valve 52, having air exhaust line 54 leading therefrom to an exhaust means (not shown) and air supply line 56 leading thereto from an air compression means (not shown). Valve control assembly 58 operates valve 52 and is connected to timer 29 through electric lines 59 and 60. Pipe 62 provides a means for fluid flow between vessel 48 and the top of reservoir 32. Gauge 63 is positioned in pipe 62 for measurement of pressure applied on the resin in 32. When the accumulator is used, bag 46 is collapsed by making connection between line 50 and exhaust line 54 through valve 52. Liquid (which passes into reservoir 32 through line 36) is thereby drawn up from reservoir 32 into vessel 48 between the inner walls thereof and bag 46. When pressure on the resin in reservoir 32 is desired, air is forced into bag 46 by making connection between line 50 and air supply line 56 thereby forcing the liquid in vessel 48 down onto the resin in 32.

Positioned in conduit 34 at the exit end thereof where resin enters tower 10 from reservoir 32, is liquid injection manifold assembly designated by numeral 70 (of the type shown in more detail in FIGURE 8) comprising three equi-spaced liquid inlet pipes 72 fed by common header pipe 74. Valve 75 controls the flow through pipe 74 by valve-control means 76 connected by electric lines 78 and 79 to timer 29.

In FIGURES 2 to 10 the particulate material transfer conduit and liquid injection pipe are shown and, for convenience, are numbered 34 and 72, respectively in each figure, to correspond with FIGURE 1.

FIGURES 2–6 and FIGURE 8 show conical-shaped bottom 90 for tower 10.

Figure 7:
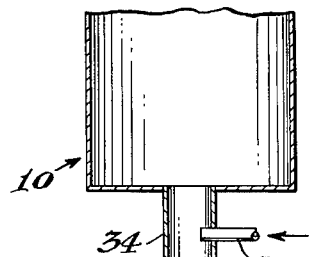
Figure 9:
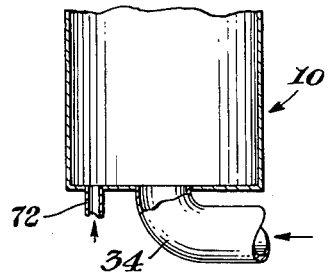
Figure 10:
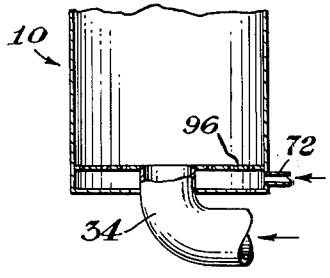

FIGURES 7, 9 and 10 show the lower portion of the contacting tower since in those figures, conduit 34 and injection pipe 72 lead directly into the cylindrical shaped tower.

FIGURES 2 to 7 show a single injection pipe 72 leading into conduit 34 but having the outlet differently positioned in each figure.

Figure 8:
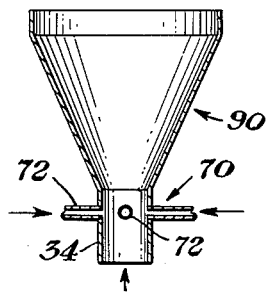

FIGURE 8 shows manifold assembly 70 comprising three inlet pipes 72 opening into conduit 34.

FIGURE 9 shows injection pipe 72 leading directly into the bottom of the contacting tower radially of the centrally positioned conduit 34.

FIGURE 10 shows perforate annular plate or screen 96 positioned horizontally near the bottom of the contacting tower. Liquid injected through pipe 72 passes upwardly through the perforate plate and is thereby broken into separate smaller streams as it is forced into the resin resting on the plate. The perforations in the plate are smaller than the size of the particles in the contacting tower.

Although the preferred location of the outlet of the injection stream into the body of particulate solids, is, as previously stated and as shown, at or not far below the place of entrance of the solids into the column, the injection stream may be located as much as about 2 inches above such entrance and at a distance of as much as 20 to 40 or more inches below such entrance. The distance below the entrance which may be employed is dependent to a large extent upon other features of construction of the contacting apparatus, particularly the diameter of the transfer conduit. The larger the transfer conduit diameter, the farther the injection stream may be below the place of entrance of the resin into the contacting tower. If the location of the injection stream, from the entrance of the resin into the tower, is not over about eight times the diameter of the transfer conduit, satisfactory transfer of resin may be attained. For example, when employing a 1 inch diameter transfer conduit, the maximum distance from the place of entry of the resin is about 8 inches and when employing an 8 inch transfer conduit, the maximum distance from the resin entry is 64 inches. However, movement of the resin column tends to become jerky when the distance below the entrance is increased over 10–12 inches unless additional pressure is applied to the resin in the reservoir.

It has also been found that when the transfer conduit for resin into the resin column contains a curve near to the point of engagement with the resin column, movement of resin is satisfactory if the point of injection is located toward the reservoir from such bend, i.e., when the bend or a substantial portion thereof is between the point of injection of the liquid stream and the point of engagement of the conduit with the tower.

Although the practice of the invention has application to the movement of either organic or inorganic confined particulate material, it will be described most fully herein in its application to the movement of a body of a suitable particulate synthetic resin being employed in an ion-exclusion or ion-exchange procedure.

The following procedure sets forth broadly, exclusive of the start-up period, a preferred way of practicing the invention employing such resin. The procedure including the start-up period, will be set forth in detail under Example 1.

The procedure is continuous and consists of a treating period, followed by a relatively short pulsing period, i.e., the period during which the column of resin in tower 10 is moved upwardly.

During the treating period suitable particulate resin 80, having water interspersed in the interstices therein, completely fills conduit 34, partially fills tower 10 to a level just below the opening into conduit 36, and valve 38 in conduit 36 being open, partially fills reservoir 32 to a level just below the opening into conduit 36. Since free communication is provided through conduit 36, water entering through pipe 12 fills the space above resin 80 in both the tower and the reservoir. The flow of wash water through pipe 12 is controlled, as by valve 20 or a float assembly. Liquid to be treated is admitted through pipe 14 into tower 10 at a controlled rate. The liquid contains or is composed of substances for which the resin has a different degree of attraction. The substance least attracted by the resin passes downwardly therein. The substance most attracted is retained by the resin and is moved upwardly with the resin and thereafter removed therefrom by the descending wash water. Product and co-product resulting from the separation affected by treatment of the liquid by contact with the resin column leave the tower through pipes 16 and 18.

The treating period, the length of which is usually determined by a series of tests made on the product and co-product, is followed by the pulsing or resin movement period of only about 5 to 15 seconds' duration. To initiate this period, outflow of product and co-product is stopped and wash water inflow is reduced or stopped. Feed inflow may be reduced or stopped if desired but is usually not changed. Any communication through return conduit 36 is closed. Concurrently pressure is applied to the resin body in reservoir 32 and water is injected through injection assembly 70 at a rate sufficient to provide at least 0.5 gallon of water per square foot of cross sectional area of the resin in the contacting tower per minute. The resin column in tower 10 is thus moved upward a desired distance usually from 1 to 5 inches dependent upon such conditions as the character and rate of flow of the liquid being treated, type and mesh of the resin, height of the resin bed and relative positions of feed and product pipes.

The pulsing step is terminated by discontinuing the application of pressure on the resin in reservoir 32 and discontinuing the injection of water through assembly 70. Communication is provided through conduit 36 so that resin forced upward in tower 10 above the entrance therefrom into conduit 36 will gravitate downwardly through 36 and replace the resin pulsed out of reservoir 32. The inflow of wash water at the top of the tower through pipe 12 and the outflow of product and co-product through outlet pipes 16 and 18 are resumed.

In practice, the timing and control of the flow of all materials participating in the process are usually automatically controlled as by air-operated valves, which are actuated by an electric relay box connected to a centrally located timer of the type represented by timer 29 of the drawing.

In the practice of the invention, the pulsing step is characterized by a smooth movement of resin, free from observed jerks and vibration in contrast to known practice.

To illustrate the practice of the invention, examples employing apparatus of the type shown in FIGURE 1 were run.

EXAMPLE 1

In this example an apparatus, having a contacting tower 5½ inches in diameter and 48 inches in height, measured from the bottom of the conical shaped bottom to the top, was employed. The diameter of reservoir 32 and of conduit 34 was ½ inch, thereby giving a ratio of the diameter of the tower to that of the conduit of 11.

The resin employed was a mixture of a 20–50 mesh size (U.S. Standard Sieve Series) cationic polymer prepared by copolymerizing a major proportion of styrene and a minor proportion of divinyl benzene according to a known polymerization procedure and subsequently sulfonating the polymer thus produced. The liquid to be treated by contact with the resin was an aqueous solution consisting by weight of 7 percent ethylene glycol, 7.4 percent NaCl, and the balance water.

The start-up procedure for Example 1 was as follows: Valves 22, 24, 26 and 75 were closed. Valves 20 and 38 were open. Valve 52 was set to admit air under pressure through lines 56 and 50 to expand bag 46. Water was admitted to tower 10 through pipe 12 some of which gravitated into reservoir 32 through conduits 34 and 36 until tower 10 and 32 were about half full. Valve 20 was then closed or nearly closed, the continued inflow of a small amount of water being immaterial. The resin was then added through the open top of tower 10 which filled conduit 34 and later conduit 36 and reservoir 32 until the resin levels in column 10 and in reservoir 32 were just below the openings into conduit 36 as shown in the drawing. Additional water, if necessary, was then added by opening valve 20 in pipe 14 until the space above the resin in both 10 and 32 were filled with water. Valve 52 was then turned to connect exhaust line 54 with line 50 to collapse bag 46, water thereupon rising and occupying the space in vessel 48 formerly occupied by the expanded bag.

The resin-treatment or contacting step then proceeded as follows: Valve 20 was continued open to provide wash water. Valve 22, was opened to admit aqueous glycol-salt feed, valve 24 was opened to provide an outlet for aqueous ethylene glycol, and valve 26 was opened to provide an outlet for aqueous NaCl. The feed by contact with the resin was separated into the ethylene glycol and NaCl solutions which were recovered through lines 16 and 18, respectively.

After treatment had continued for from about 2.5 minutes, the resin was pulsed or moved as follows: Valves 20, 24, 26 and 38 were closed by timer 29 through the respective control means. Valve 52 was turned to provide pressurized air to expand collapsed bag 46, and hence to provide pressure on resin 80 in reservoir 32. Concurrently therewith, valve 75 was opened to admit an injection of water through pipe 74 into manifold 70 and thence through lines 72 into the resin just below the junction of conduit 34 and tower 10. The pressure at gauge 63 was 20 pounds and the rate of injection of water through manifold 70 was 2.5 gallons per square foot of cross section of the contacting tower per minute. The resin movement period was continued for about 8 seconds during which the resin moved upwardly in the tower about 3 inches. The movement was a plug-flow movement and marked by the absence of any vibration or jerkiness.

Following the pulsing of the resin, the valves were then automatically reset, through timer 29 and the respective valve-control means, to the positions which existed during the treating period prior to resin movement. The treating and resin movement steps were then successively repeated continuously. Periodic samples of effluent from pipe 16 showed it to contain no measurable quantity of NaCl and periodic samples of effluent from pipe 18 showed it to contain no measurable quantity of ethylene glycol.

The procedure of Example 1 was repeated but, for purposes of comparison, no water was injected through manifold 70. No movement of resin was obtained although the pressure on the resin in reservoir 32 was raised to 30 p.s.i.g.

EXAMPLE 2

Example 1 was repeated but the apparatus employed was altered so that the 48 inch high tower had a diameter of 2 inches and a resin supply conduit had a diameter of ¾ inch. This is a ratio of diameters of the column to the supply conduit of 2⅔. Movement of resin in the column, by employing the water injection through manifold 70 in accordance with one mode of practicing the invention, produced smooth flow at a pressure of 5 pounds per square inch on the resin in reservoir 32.

For purposes of comparison, the injection water into manifold 70 was turned off and the procedure of Example 2 otherwise repeated. No movement of resin was obtained until pressure on the resin in reservoir 32 was increased to 30 p.s.i.g. when an extremely jerky movement occurred.

For further comparison, the procedure of Example 1 was again repeated but there was used an apparatus employing a tower having a diameter of 1¼ inches and a resin supply conduit and a reservoir each having a diameter of ¾ inch but the water injection means of the invention was not used. This was a diameter ratio of 1⅔. At a pressure of 30 p.s.i.g., a jerky and unsatisfactory movement was obtained.

For still further comparison, the procedure of Example 1 was again repeated, but an apparatus was employed which had a 1¼ inch diameter tower and 1½ inch diameter resin supply conduit and reservoir (which was a diameter ratio of tower to feed conduit of .8) and again without employing the water injection means of the invention. Pressure on the resin was increased to 30 p.s.i.g., but movement was still jerky.

EXAMPLE 3

The apparatus employed in Examples 1 and 2 was replaced by one of similar structure but of considerably greater capacity. The column of resin in the contacting tower (measured from the entrance of conduits 34 and 36) was 15.5 feet in height and was 30 inches in diameter. The resin in the resin supply conduit and reservoir (measured from the entrance of conduit 36 and point 35 at the bottom of the bend in conduit 34) was 15.75 feet in height and was 8 inches in diameter. The water injection during movement of resin was about 2.4 gallons per square foot of resin in the contacting column per minute.

The procedure of Examples 1 and 2, employing the same type resin and glycol-salt solution, was substantially followed except that the pressure on the resin in reservoir 32 was varied. In each instance, movement with the water injection according to the invention was contrasted to attempted movement without the water injection. The results are set out in Table I below:

*Table I*

| Pressure on resin in reservoir in p.s.i.g. on gauge 63 | Type of movement, if any, when employing known procedure, i.e., without water injection | Type of movement when employing water injection according to the invention |
|---|---|---|
| 75 | None | Smooth. |
| 60 | do | Do. |
| 50 | do | Do. |
| 25 | do | Do. |

Reference to Table I shows that even as much as 75 pounds' gauge pressure per square inch on the resin in the reservoir, when not accompanied by water injection according to the invention, resulted in no movement of resin whereas smooth movement was obtained at all pressures employed when water was injected according to the invention.

EXAMPLE 4

The apparatus of Example 1 (5½ inch diameter resin contacting column and 1 inch diameter resin feed conduit and reservoir) was employed except a tower having a height of about 96 inches was employed to accommodate a column height greater than that employed in Example 1. The procedure was that followed in Example 1, employing the injection of water through manifold 70 at a rate of 2.5 gal./ft.$^2$ of resin in the contacting tower/min. In this example, however, the height of the resin in the contacting tower was varied and the pressure on the resin in reservoir 32 adjusted to that value which was just sufficient to provide smooth movement of resin. The values are set out in Table II below.

*Table II*

| Resin height in contacting column in inches: | Pressure in p.s.i.g. on resin in reservoir |
|---|---|
| 7 | 5 |
| 18 | 5 |
| 29 | 5 |
| 50 | 5 |
| 60 | 6 |
| 70 | 6 |

The resin moved smoothly at all pressures used.

The procedure of Example 4 was then repeated for comparative purposes wherein no water was injected into the resin through manifold 70, i.e., at the place of entrance of conduit 34 into tower 10. The resin column height and the pressures required to move the resin at each height are set out below in Table III.

Table III

| Resin height in inches in contacting column | Pressure in p.s.i.g. on resin in reservoir |
|---|---|
| 10 | 10 |
| 18 | 10 |
| 29 | 15 |
| 30 | 50 |

All movement was accompanied by pronounced "bumping" or pulsating jerks and difficulty of control of resin movement, that of the 30 inch height, which required 50 p.s.i.g. to move it, being of an especially violent nature.

FIGURE 11 shows graphically the results of Example 4 (Table III) wherein the pressure in p.s.i.g. employed when water was injected during application of pressure on the resin in the reservoir is contrasted to that required for comparative resins wherein only pressure on the resin in the reservoir was applied without the aid of water injection.

EXAMPLE 5

Further runs were made employing different particulate materials, wherein the practice of the invention was compared to runs made according to known practice. Materials varying in compressibility, shape, density, and particle size were employed. The apparatus employed was that used in Example 4, i.e., one having a 5½ inch diameter contacting tower and a 1 inch reservoir and transfer conduit to the tower. The procedure was substantially the same as that of Example 4. The mesh size is in accordance with the scale of the Stantard U.S. Sieve Series. The compressibility was based on an arbitrary scale wherein a highly compressible sulfonated copolymer prepared by copolymerizing 98 percent styrene and 2 percent divinylbenzene (DVB) was given a compressibility of 3 and a non-compressible material such as sand was given a compressibility of 0.

A description of the particulate material employed, the conditions of operation, and the type of movement, if any, of the material are set out in Table IV.

Table IV

| Description of particulate material moved or attempted to be moved | | | | | Comparison of conventional method to that of invention | | | | |
|---|---|---|---|---|---|---|---|---|---|
| | | | | | According to conventional practice | | According to practice of the invention | | |
| Type | Particle size | Density | Shape | Relative compressibility | Pressure on reservoir [1] | Type of movement | Pressure on reservoir [1] | Injection rate [2] | Type of movement |
| 98 styrene 2 DVB [3] | 20-50 | 1.09 | Spherical | 3 | 30 | None | 5 | 1.2 | Smooth. |
| 96 styrene 4 DVB [3] | 20-50 | 1.18 | do | 2 | 30 | do | 5 | 1.2 | Do. |
| Do.[3] | 200-400 | 1.18 | do | 2 | 30 | Smooth | 5 | 1.8 | Do. |
| 92 styrene 8 DVB [3] | 20-50 | 1.20 | do | 2 | 30 | None | 5 | 1.2 | Do. |
| Do.[4] | 50-60 | 1.05 | do | 1 | 30 | do | 5 | 1.2 | Do. |
| Ottawa sand | 30-60 | 2.18 | Jagged grains | 0 | 50 | do | 5 | 1.4 | Jerky. |
| Aspirin crystals | 20-60 | 1.55 | Rod-like | 0 | 30 | do | ([5]) | 1.4 | Smooth. |
| Glass beads | 30-60 | 2.45 | Spherical | 0 | 30 | do | 5 | 1.4 | Do. |

[1] Pressure on gauge 63 and stated in p.s.i.g.
[2] Water injection in gallons per square foot of cross-section of bed of particulate solids in contacting tower per minute.
[3] Represents a copolymer formed by copolymerizing 98 percent styrene and 2 percent divinylbenzene by weight and sulfonated.
[4] This copolymer was not sulfanoted.
[5] Minimum pressure required to move aspirin crystals not measured.

An examination of Table IV shows that smooth movement was obtained when water was injected according to the invention, in all instances, when a pressure on the resin in the reservoir of only 5 p.s.i.g. was employed, except where the sand was moved in which case the movement was jerky. The table also shows that according to conventional practice no movement of resin except the 200-400 mesh resin, was obtained for any material tried at a pressure of 30 p.s.i.g. for all materials except sand when 50 p.s.i.g. were used without movement.

EXAMPLE 6

An apparatus similar to that used in Example 3, i.e. one having a tower 30 inches in diameter and a height of 15.5 feet between the entrance of conduits 34 and 36, except that the 8 inch diameter conduit pipe 32 was replaced by one having a diameter of only 1 inch. This was a ratio of the diameter of the contacting column to the transfer conduit of 30:1. The procedure of Example 3 was substantially followed but the pressure on the resin in reservoir 32 was raised as set out in Table V below, accompanied concurrently with injection of water through manifold 70 into conduit 32 at the bottom of the tower at a rate of about 2.5 gallows per minute. The examples were repeated for each pressure used, for comparative purposes, wherein the procedure was the same except the introduction of water according to the invention was not employed. The results are shown in Table V below.

Table V

| Pressure in p.s.i.g. in reservoir | Movement, if any, of resin | |
|---|---|---|
| | According to known practice wherein no water is injected | Employing injection water according to invention |
| 15 | None | Slightly jerky. |
| 25 | do | Smooth. |

Reference to Table V shows that smooth movement is readily attained at a pressure of 25 p.s.i.g. on the resin supply employing a ratio of the diameter of the contacting column of resin to the supply conduit of 30:1 by the practice of the invention whereas no movement was attained when the injection water was not used.

EXAMPLE 7

This example employed the apparatus of Example 1, i.e., a tower 5½ inches in diameter and a transfer conduit 1 inch in diameter. The precedure of Example 1 was followed except manifold 70 was positioned in U-shaped conduit 34 at a point 35 which was about 20 inches from the entrance of conduit 34 into tower 10.

When the manifold was thus positioned, a bend of about 90 degrees existed between the manifold and the entrance of the resin into tower 10. Water was injected at a rate of about 2.5 gallons/sq. ft. of resin in the contacting column/minute through manifold 70 concurrently with the pressures applied to the resin in the reservoir which are set out in Table VI. A jerky movement was attained at all pressures employed.

Table VI

| Pressure in p.s.i.g. on resin in reservoir: | Movement attained |
|---|---|
| 15 | Jerky. |
| 20 | Do. |
| 30 | Do. |

The results of Table VI show that a satisfactory movement of resin is not attained when the water is injected at a point located beyond a substantial bend in the resin transfer pipe leading from the resin supply to the tower. In other words, if the water is not injected immediately below the entrance of the resin into the contacting tower according to preferred practice, then it should be injected substantially directly below, i.e., in substantially vertical alignment with the entrance into the tower.

The invention offers pronounced advantages in a method of treating a liquid by passing the liquid through a particulate bed of material, e.g., resin, wherein such bed must be moved, whether continuously or periodically. The invention also offers advantages in the movement of any confined wetted particulate material which is required to be moved, either continuously or periodically.

Among such advantages are (1) absence of vibration, spasmodic jerks, and "bumping" of the solids during movement, (2) movement of confined resin which otherwise could not be moved at all under practical conditions employing an apparatus constructed of conventional materials, (3) movement of particulate materials at markedly lower pressures, and (4) significant reduction in breakage or attrition of fragile or friable material during movement.

Having described the invention, what is claimed and desired to be protected by Letters Patent is:

1. In a method of contacting a liquid to be treated and a body of wetted particulate solids confined in a column having access to a confined source of supply of said solids through a connecting channel of less diameter than the column, and which extends from the source of supply to the lower part of said column, and wherein said solids in the column are required to be moved upwardly as a substantially plug-flow body by the application of pressure and said source, the improvement consisting of injecting a liquid miscible with said liquid to be treated into said solids, at a rate of injection of said liquid of at least about 0.5 gallon per minute per square foot of cross-sectional area of said column, substantially at the place of entrance of the solids from the source of supply into the column and substantially concurrently with the application of pressure on said source of supply.

2. The method of claim 1 wherein said miscible liquid is injected at a distance of not over 2 inches above the place of entrance of said solids into said column and not over a distance of eight times the diameter of said connecting channel substantially directly below the entrance of said solids into said column.

3. The method of claim 2 wherein said miscible liquid is water.

4. The method of moving a body of wetted particulated solids upwardly in a column, in a plug-flow manner, consisting of transferring a stream of solids from a source outside of said column through a confining system into the bottom of said column by applying pressure to said source sufficient to overcome the hydrostatic head of the wet solids in said column and, substantially concurrently with the application of pressure on the source, injecting a liquid at a rate of at least 0.5 gallon per square foot of cross-sectional area of said column per minute into said stream of solids at a point not over 2 inches above the place of entrance of said solids from the source into the column, and not over eight times the diameter of said stream substantially directly below said place of entrance.

5. In an apparatus for contacting a liquid and a body of particulate solids having a contacting tower, means for passing the liquid through said body of solids in the tower, means for recovering products resulting from said contacting, a reservoir for particulate solids having a lower conduit of less diameter than said contacting tower leading from the reservoir to the lower part of the tower for passage of particulate solids into the tower and an upper conduit leading from the tower into the reservoir for the passage of displaced particulate solids from the tower into the reservoir for the passage of displaced particulate solids from the tower into the reservoir, and means for applying pressure to urge movement of resin from the reservoir into said lower conduit, the improvement consisting of at least one liquid-injection pipe opening into said lower conduit at a point, not substantially below the place of attachment of said lower conduit into said tower to provide a controlled flow of liquid into the particulate solids substantially at the entrance thereof into said tower, pressure means to force liquid through said liquid injection pipe, and control means to regulate the flow of liquid through said pipe and into said lower conduit.

6. The apparatus of claim 5 wherein the bottom of said tower is frusto-conical, the sides of said frusto-conical bottom forming an angle not substantially greater than about 90°, and said lower conduit opens into said bottom at the apex thereof.

7. The apparatus of claim 5 wherein the said injection pipe extends into said lower conduit to a distance not exceeding the radius thereof.

8. The apparatus of claim 5 wherein a plurality of liquid injection pipes open into said lower conduit at a distance below the place of attachment of said lower conduit into said tower of not greater than eight times the diameter of said lower conduit.

9. The apparatus of claim 8 wherein said injection pipes are substantially equi-spaced axially about said lower conduit.

10. The apparatus of claim 5 wherein said injection pipe opens directly into the bottom of said tower at a point not over 2 inches thereabove and directly below said bottom.

References Cited in the file of this patent

UNITED STATES PATENTS

| 2,815,322 | Higgins | Dec. 3, 1957 |

FOREIGN PATENTS

| 778,859 | Great Britain | July 10, 1957 |
| 780,406 | Great Britain | July 31, 1957 |